UNITED STATES PATENT OFFICE.

PETER MURPHY, OF JERSEY CITY, NEW JERSEY.

PROCESS OF MAKING ADHESIVES.

SPECIFICATION forming part of Letters Patent No. 568,265, dated September 22, 1896.

Application filed February 29, 1896. Serial No. 581,372. (No specimens.)

*To all whom it may concern:*

Be it known that I, PETER MURPHY, of Jersey City, in the county of Hudson and State of New Jersey, have invented a new and useful Improvement in Processes of Making Adhesive Substances, of which the following is a full, clear, and exact description.

Heretofore both starch and dextrin have been used in making paste or glue, but the use of these substances is attended by certain disadvantages, owing to the fact that starch is not sufficiently soluble in water to adapt it for convenient use, while dextrin is so soluble as to render its use unnecessarily expensive, especially where a quick-drying glue or mucilage is desired.

The object of the present invention is in part to provide an adhesive substance which in point of solubility shall stand between starch and dextrin, so that it shall be adapted for all the uses to which these substances are applied, and in part to provide a simple and inexpensive method of making such adhesive substance, whereby it shall be produced cheaply and in a form adapted for immediate and convenient use.

In carrying out my invention in the preferred way I proceed as follows: To one gallon of water I add two pounds of starch and one-eighth ounce of sulfuric acid or its equivalent. These ingredients are mixed, and through the mixture is passed steam at a temperature of about 250° Fahrenheit, this heating being continued for about two hours. At the end of the first hour the mass will have become more or less solid, and at the end of the second hour it will have become almost liquid. At the end of the second hour a sufficient quantity of carbonate of lime or other suitable substance is added to the mixture, to neutralize the acid present, after which the mixture is filtered to remove the sulfate of lime, together with any remaining carbonate of lime or other solid impurities. The mixture after being filtered is allowed to cool, and in cooling solidifies into a stiff white jelly-like mass or paste suitable for all ordinary purposes for which paste and mucilage is desirable.

In the manufacture of paste from starch it is found that one-half pound of starch added to one gallon of water produces a stiff jelly-like paste, which, however, lacks adhesive power, by reason of the comparatively small proportion of starch present, and, further, by reason of the inferior adhesive properties of starch, and in the manufacture of mucilage and paste from dextrin it is found that two pounds of dextrin added to one gallon of water produces a thin watery solution unfit for use for ordinary purposes.

The new and improved substance, produced as above described and which I call "subdextrin," possesses, on the contrary, the requisite adhesive properties to adapt it for use as a paste or glue when produced, and, furthermore, is much less expensive than mucilage or paste formed from dextrin.

Having thus described my invention, I claim as new and desire to secure by Letters Patent—

1. The herein-described method of making adhesive substance which consists in subjecting starch to the action of dilute sulfuric acid or its equivalent at a temperature above boiling-point and continuing the heat until the mass becomes almost liquid but discontinuing the heating before the mass becomes converted into dextrin, then neutralizing the acid, and finally allowing the liquid to cool and solidify, substantially as described.

2. The herein-described method of making subdextrin which consists in subjecting starch to the action of dilute sulfuric acid or its equivalent at a temperature of about 250° Fahrenheit for two hours, then neutralizing the acid, and allowing the liquid to cool and solidify, substantially as described.

PETER MURPHY.

Witnesses:
J. D. CAPLINGER,
JNO. M. RITTER.